United States Patent [19]

Moriki et al.

[11] Patent Number: 4,634,167
[45] Date of Patent: Jan. 6, 1987

[54] STRUCTURE FOR REINFORCING AUTOMOTIVE COVER MEMBER OF SYNTHETIC RESIN

[75] Inventors: Shinichi Moriki, Tokyo; Kazuyuki Okui, Asaka, both of Japan

[73] Assignee: Honda Giken Kogyo Kabushiki Kaisha, Tokyo, Japan

[21] Appl. No.: 751,910

[22] Filed: Jul. 5, 1985

[51] Int. Cl.$^4$ ............................................. B62D 25/00
[52] U.S. Cl. .................................. 296/31 P; 296/76; 180/69.2; 264/258; 428/255
[58] Field of Search .............. 296/76, 31 P; 180/69.2; 264/258, 113, 120, 236, 347; 428/255

[56] References Cited

U.S. PATENT DOCUMENTS 4,353,857 10/1982 Ray et al. ............................ 264/258

FOREIGN PATENT DOCUMENTS 56-60776 5/1981 Japan .

Primary Examiner—Robert R. Song
Attorney, Agent, or Firm—Armstrong, Nikaido, Marmelstein & Kubovcik

[57] ABSTRACT

A resinforced cover member for automobile made of a synthetic resin comprising a lid body having a generally rectangular shape and a plurality of ribs extending generally perpendicularly from a bottom face of the lid body. The ribs include various types of ribs. A first set of at least two peripheral ribs extend along one longer side of the lid body while a second set of at least two peripheral ribs extend along the other longer side. A third pair and a fourth pair of peripheral ribs extend along the shorter sides of the lid body. A first set of angular ribs continuously extend to connect a generally central point of the one longer side of the lid body and the two end portions of the other longer side. A second set of angular ribs continuously extend to connect a generally central point of the other longer side and the two end portions of the one longer side. Additional angular ribs can be arranged parallel to the first and second set of angular ribs. First short ribs can connect together the first set of at least two peripheral ribs and second short ribs can connect together the second set of at least two peripheral ribs. A first closure plate can be fixed to the first set of peripheral ribs and the first short ribs defining plural closed compartments and a box-like girder. A second closure plate can be fixed to the second set of peripheral ribs and the second short ribs defining further plural closed compartments and a second box shaped girder.

3 Claims, 9 Drawing Figures

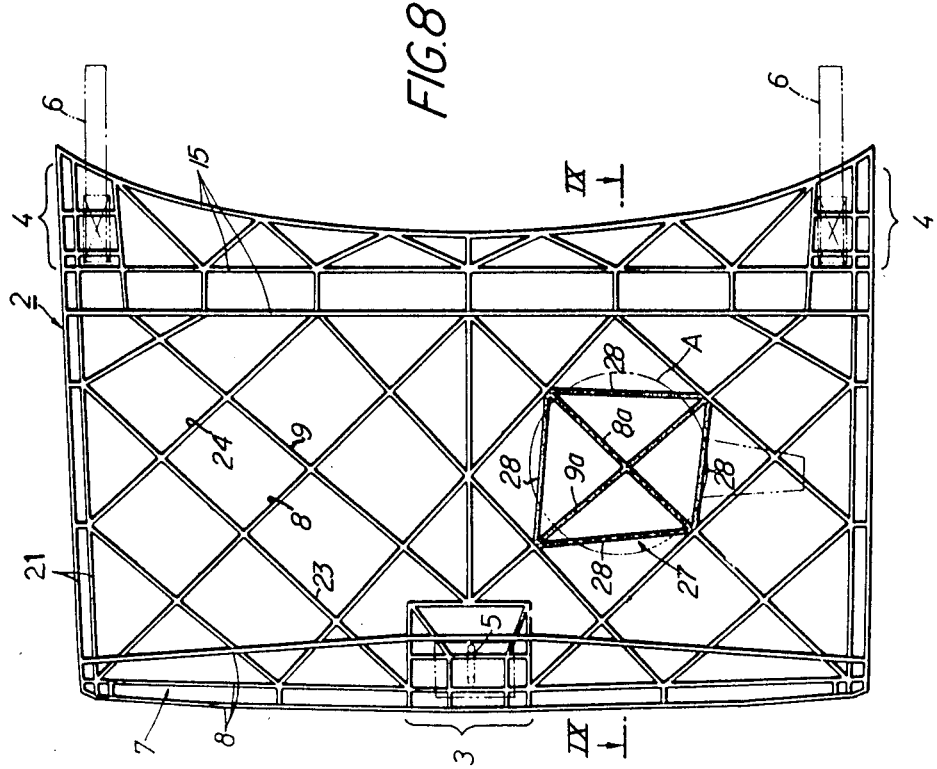

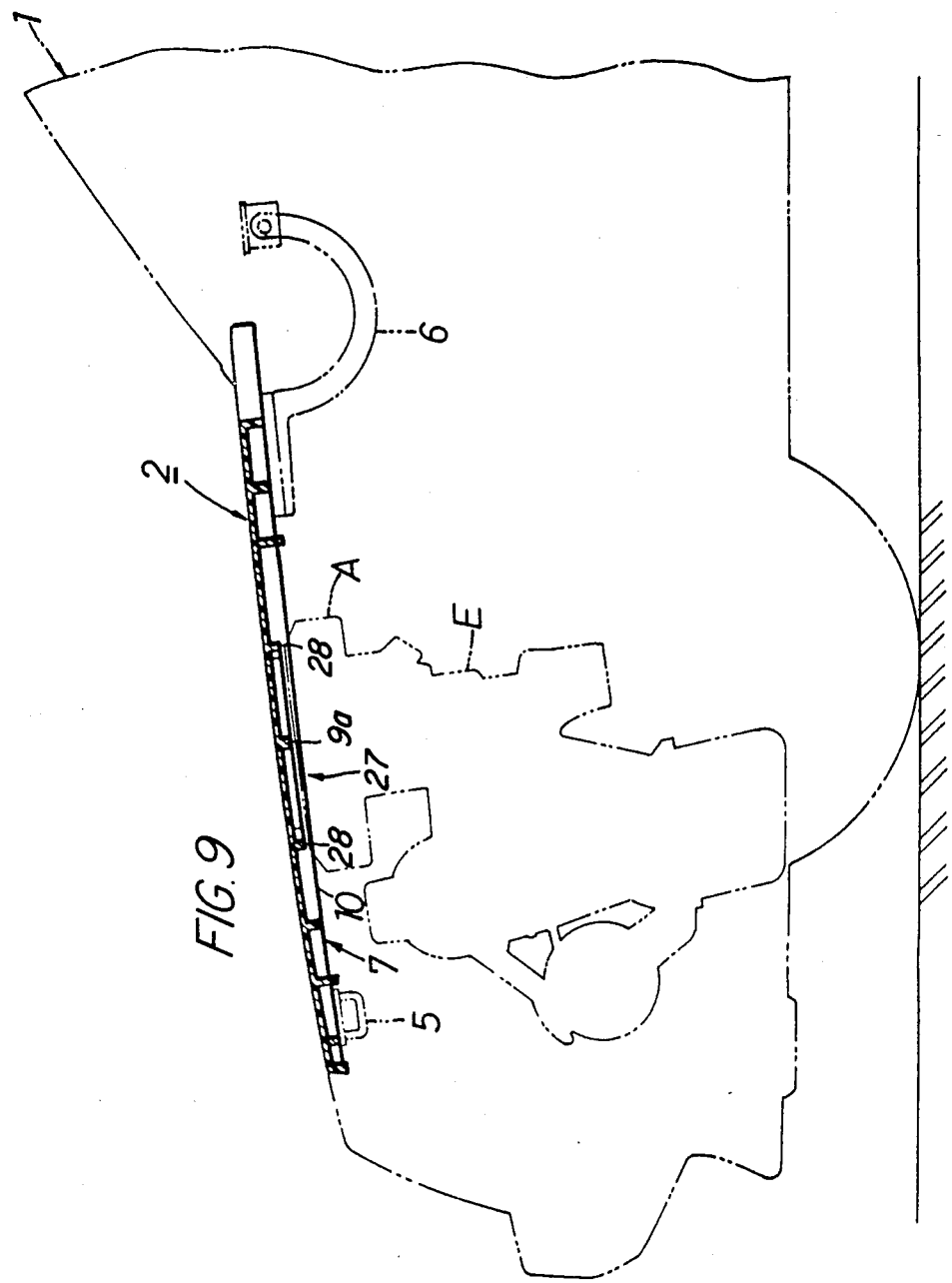

STRUCTURE FOR REINFORCING AUTOMOTIVE COVER MEMBER OF SYNTHETIC RESIN

BACKGROUND OF THE INVENTION

The present invention relates to a structure for reinforcing an automotive lid made of synthetic resin, and more particularly, relates to hood or trunk lid made of a synthetic resin having a particular arrangement of downwardly depending reinforcing ribs.

It is already known, as disclosed in Japanese Utility Model Publication No. 44-7602, Japanese Patent Application Laid Open No. 56-60776, or U.S. Pat. No. 4,353,857 to mold a reinforced cover member for an automobile for use such as a hood lid or a trunk lid from a synthetic reinforced resin. A cover member of this type generally has the advantage that it is lighter than one made of steel plate. However, it also has the disadvantage that it is generally inferior in rigidity. Therefore, in the prior art, the cover member is reinforced by forming a plurality of ribs projecting from the lower face of the lid body. Such reinforcing by the use of ribs is difficult to apply to a lid having a large area. If the number of ribs is increased to enhance the rigidity, the reinforcing effect is increased only a small amount relative to the rapidly increasing rate of the weight which would negate the benefit of using the reinforced synthetic over using metal. As an alternative, the height of the ribs can be increased, however, such an increase increases the vertical height of the cover member thereby reducing the volume available which is being covered.

The reduction of volume can particularly be a problem in certain areas of the engine compartment of an automobile. That is, it is well known that the engine or auxiliary equipment have local portions projecting upwardly from the main body of the engine. There arises a problem that the cover member or hood lid must accommodate these local projecting portions.

OBJECTS AND SUMMARY OF THE INVENTION

It is an object of the present invention to provide a highly efficient reinforcing structure for a reinforced cover member for an automobile made of a synthetic resin which can be effectively reinforced with a smaller number of shorter ribs.

It is a further object of the present invention to provide such a reinforcing structure which enables the cover member to have a high torsional rigidity.

It is a further object of the present invention to provide a reinforced structure which enables the use of locally high portions on the engine in an engine compartment therebelow without wasting a significant amount of volume of the engine compartment.

These and other objects are obtained in a reinforced cover member for an automobile comprising a lid body having a generally rectangular shape, a top face and a bottom face, and a plurality of ribs extending generally perpendicularly from the bottom face. The ribs and the lid body are integrally molded of the synthetic resin. The ribs include certain particular members. A first set of at least two peripheral ribs extend along one longer side of the lid body. A second set of at least two peripheral ribs extend along the other longer side of the lid body. A third pair and a fourth pair of peripheral ribs extend along the shorter sides of the rib body. A first set of angular ribs continuously extend to contact a generally central point of the one longer side of the lid body to the two end portions of the other longer side. A second set of annular ribs continuously extend to connect a generally central point of the other longer side and the two end portions of the one longer side.

The ribs can further include additional angular ribs arranged in parallel to the first set and the second set of annular ribs.

The ribs can further include first short ribs connecting together the first set of at least two peripheral ribs, and second short ribs connecting together the second set of at least two peripheral ribs.

To improve torsional rigidity, a first closure plate can be fixed to the first set of at least two peripheral ribs and the first short ribs thereby defining plural closed compartments and a first box girder. A second closure plate can be fixed to the second set of at least two peripheral ribs and the second short ribs thereby defining further plural closed compartments and a second box girder.

A striker anchoring portion can be provided at the generally central point of the one longer side with a striker being attached thereto. Hinge anchoring portions can be provided at each end portion of the other longer side with hinges attached respectively thereto.

BRIEF DESCRIPTION OF THE DRAWINGS

The above and other objects and the attendant advantages of the present invention will become readily apparent by reference to the following detailed description when considered in conjunction with the accompanied drawings wherein:

FIG. 8 is a bottom plan view of a third embodiment of the present invention; and FIG. 9 is a cross-sectional view taken along lines IX—IX of FIG. 8.

DETAILED DESCRIPTION OF PREFERRED EMBODIMENTS

Figure 5:
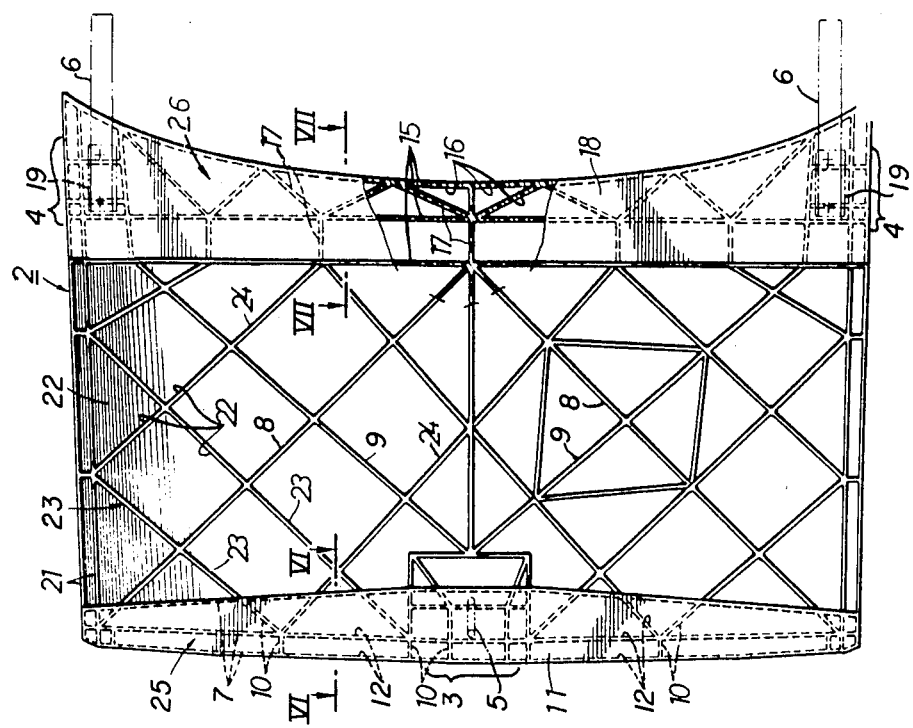
FIG. 5 is a bottom plan view of a second embodiment of the present invention.

Throughout the several views of the drawings, like reference numerals refer to like parts.

Figure 1:
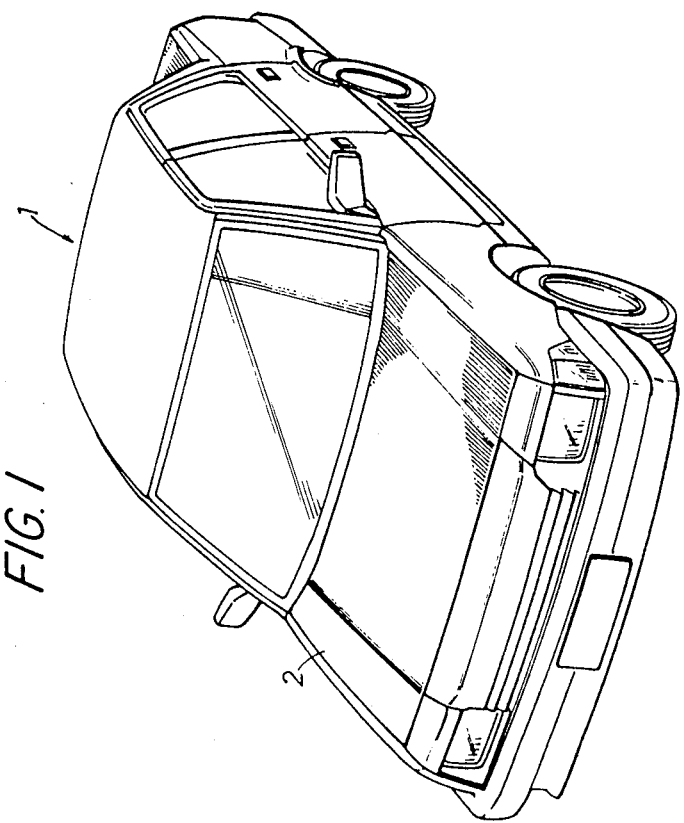
FIG. 1 is a perspective view showing an automobile having a reinforced cover member or hood according to the present invention.

As shown in FIG. 1, a cover member 2 according to the present invention is usable as a hood lid on an automobile 1.

Figure 2:
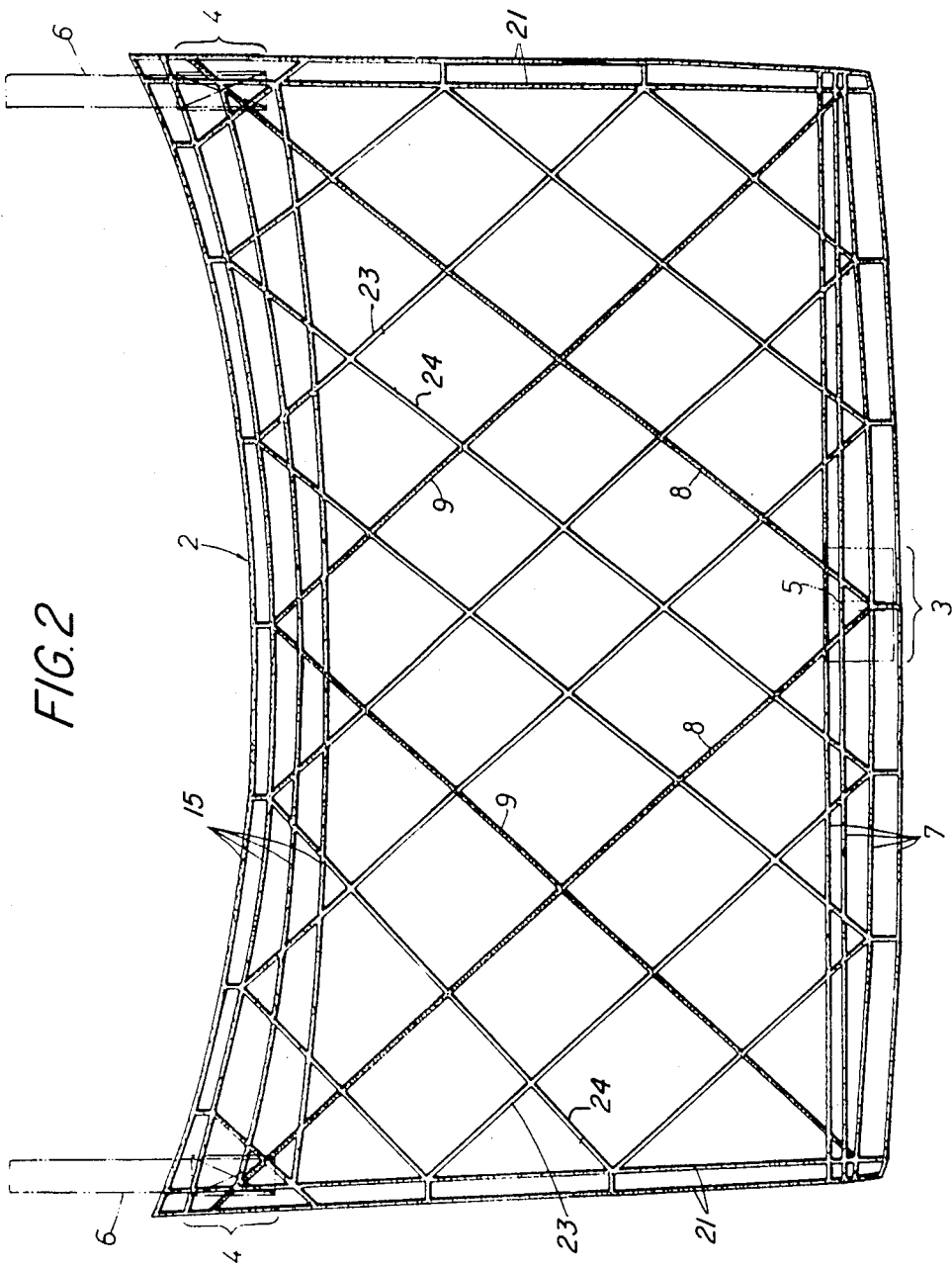
FIG. 2 is a bottom plan view showing a first embodiment of the present invention.

FIG. 2 shows a first embodiment of the present invention in which the lid body 2 is molded of a synthetic resin such as an SMC material (sheet molding compound material). Since sheet molding compound including resins, fibers, fillers, additives, etc, is well known and widely available, there is no need for an extensive description of its preparation. Briefly, however, sheet molding compound is made in one process by dropping fiber (e.g. chopped glass) onto a moving bed of formulated resin. The formulated resin has been previously spread on a thin sheet of plastic (e.g., polyethylene) which serves as a backing. After fiber has been dropped onto the resin and an admixture made thereby, a second resin coating plastic sheet covers the fiber and resin admixture. Thus, the first and second resin coated plastic sheets have sandwiched between them two layers of formulated resin and one layer of fiber. A sandwich so made may be aged for a period of time. The sandwich may thereafter be cut into sections and molded.

The lid body 2 is basically of rectangular shape having longer sides extending transversely of the automobile. The front longer side is curved slightly outwardly and its rear longer side is curved largely inwardly such that the central portion of the front longer side provides a striker anchoring portion 3. Both of the end portions of the rear longer side provide a pair of hinge anchoring portions 4. A striker 5 is fastened to the striker anchoring portion 3 for fixing the front longer side of the lid body 2 to the automobile body in a known removable manner. A pair of hinges 6 are fastened to the hinge anchoring portions 4 for hinging the rear longer side of the lid body 2 to the automobile body.

The lid body 2 has formed on its bottom face a plurality of ribs 7, 8, 9, 15, 21, 23, and 24. The ribs are integrally molded with the lid body. Various types of ribs are present. Extending along the front longer side of the lid body are a first set of at least two peripheral ribs 7. In the embodiment shown in FIG. 2, four such peripheral ribs are shown. Extending along the other or rear longer side of the rib body is a second set of at least two peripheral ribs 15. In the embodiment shown in FIG. 2, four such peripheral ribs 15 are shown. A third pair and a fourth pair of peripheral ribs 21 extend along the shorter sides of the lid body.

A first set of angular ribs 8 continuously extend to connect a generally central point of the front longer side of the lid body (adjacent the striker anchoring portion 3) and the two end portions of the rear longer side (adjacent the hinge anchoring portions 4). A second set of angular ribs 9 continuously extend to connect a generally central portion of the rear longer side of the lid body and the two end portions of the front longer side.

The peripheral ribs 7, 15, 21 and the first set and second set of angular ribs 8, 9 coact to enhance the torsional rigidity of the lid body 2 with high efficiency.

Figure 3:
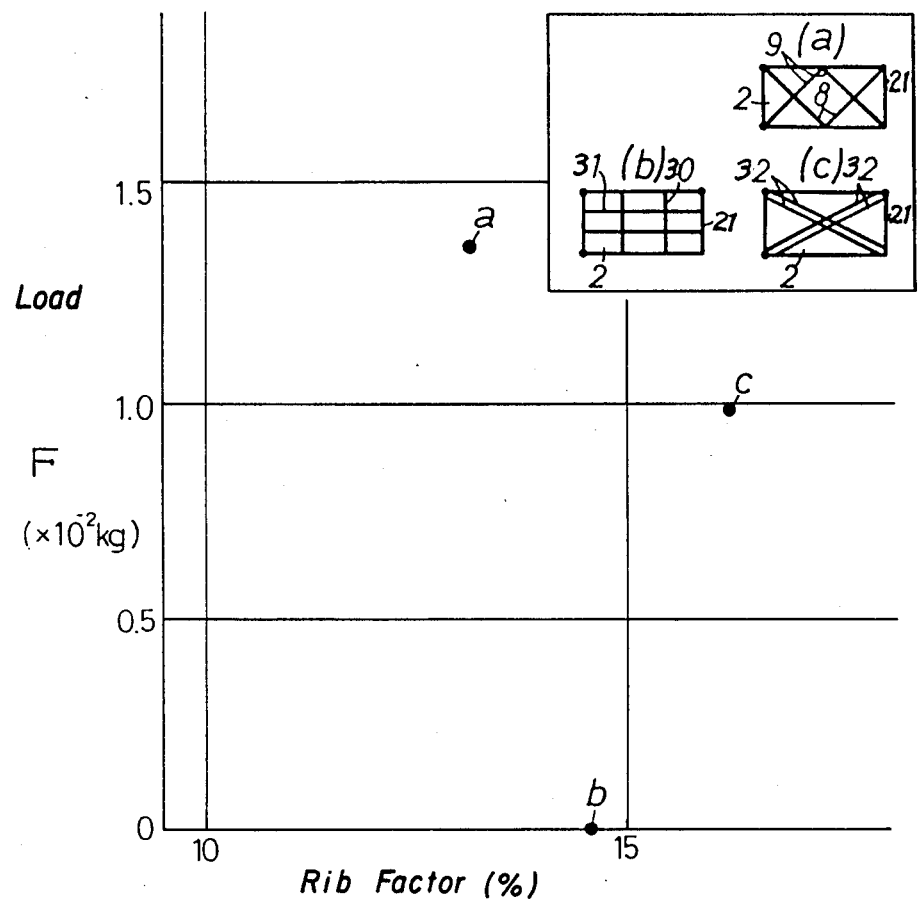
FIG. 3 is a graph plotting the results of the torsional rigidity tests of samples in which sample a is of the present invention and samples b and c are presented for comparison.

Certain tests were performed, the results of which were shown in FIG. 3. In this test, three samples a, b, c, were prepared. Sample a was prepared by forming on the inner face of a synthetic resin lid body a single peripheral rib 21 extending around the entire body, and a first set of angular ribs 8 and a second set of angular ribs 9 in accordance with the present invention. Sample b was prepared by forming on the bottom face of a synthetic resin lid body a single peripheral rib 21 extending around the entire body and two longitudinal ribs 30 together with two transverse ribs 31 intersecting at right angles. Sample c was prepared by projecting a single rib 21 extending around the peripheral edge of the entire lid body and two parallel pairs of diagonal ribs 32 from opposing corners of the lid body.

In each of the samples so prepared, the lid body had a width of 1,200 mm, a depth of 600 mm, and a thickness of 2 mm. All of the ribs were sized to have a height of 15 mm and a thickness of 1.8 mm.

Figure 4:
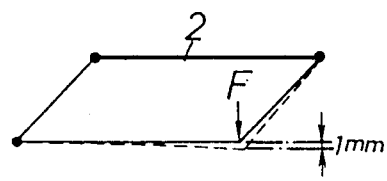
FIG. 4 is a diagram for explanation of the testing method producing the data shown in FIG. 3.

The samples were tested in a manner as shown in FIG. 4. The respective samples a, b, c, were placed on a test table such that the lid body 2 was fixed at three corners (indicated by solid circles), i.e., it had its front side fixed at its one end portion and its rear side fixed at both end portions. A vertical load F was applied to the remaining free end portion. The amount of force F necessary to establish a distortion of 1 mm was recorded and is plotted in FIG. 3.

FIG. 3 shows the "load" F (amount of force necessary to deflect the free end 1 mm) against the "rib factor". The larger the value of the ordinate indicates the higher torsional rigidity of the lid body whereas the larger value of the abscissa indicates the higher weight increasing rate of the bonnet by the ribs. The "rib factor" is derived from the following equation: Rib factor=(total weight of ribs)/(net weight lid body without ribs)×100 (percent).

The results of this test reveal that the first sample a according to the present invention exhibited a far higher value of the ordinate and a far smaller value of the abscissa than those of the second and third samples b and c. From this, it will be understood that the reinforcing structure according to the present invention can contribute to an efficient reinforcement of the torsional rigidity of the lid body 2.

Referring back to FIG. 2, the lid body 2 is further formed with plural additional angular ribs 23, 24 which are connected to the peripheral ribs 7, 15, or 21 to further contribute to the better reinforcement of the torsional and facial rigidity of the lid body 2. Thus, as can be seen, high torsional rigidity imparted to the lid body 2 by a smaller number of ribs so that the synthetic resin cover member can have its torsional rigidity enhanced sufficiently without any deterioration of the intrinsic advantage of the light weight thereof.

In the second embodiment shown in FIG. 5, the lid body 2 is further formed with a pair of front and rear box-shaped structures 25, 26 which extend along the front longer and rear longer sides thereof, respectively.

The front box-shaped structure 25 is constructed of the first set of at least two peripheral ribs 7 (the embodiment of FIG. 5 being shown with three) extending along the front longer side of the lid body 2 spaced apart from one another. A plurality of first short ribs 10 connect together the first set of at least two peripheral ribs 7. Such short ribs are also shown in FIG. 2. The short ribs 10 partition the spaces between the peripheral ribs 7 into a plurality of compartments 12. A first closure plate 11 is fixed to the ribs 7 and closes all of the compartments 12 defined by the ribs 7 and 10. An adhesive can be used for fixing the first closure plate 11 to the ribs 7. A striker 5 can be fixed to the front end, center portion of the closure plate 11.

Figure 7:
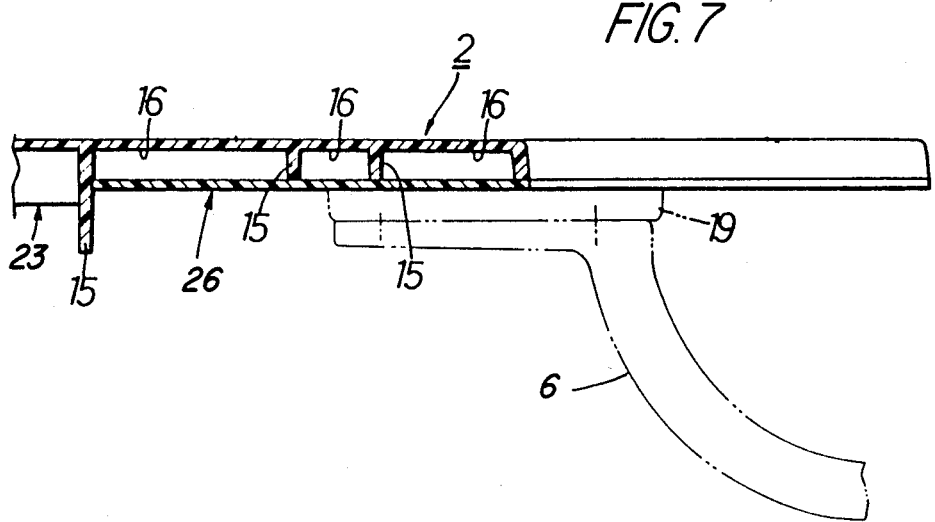
FIG. 7 is a cross-sectional view taken along lines VII—VII of FIG. 5.
Figure 6:
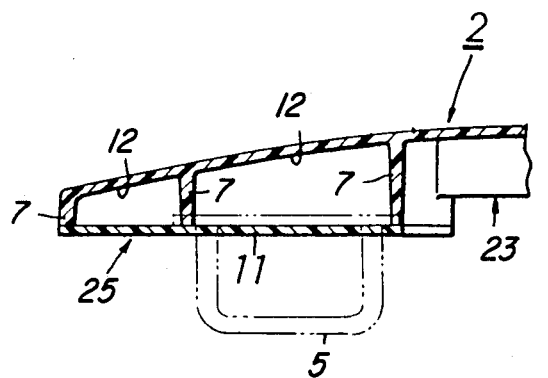
FIG. 6 is cross-sectional view taken along lines VI—VI in FIG. 5.

The rear box-shaped structure 26 along the rear longer sides of the lid body 2 is formed in a manner similar to that of the front box-shaped structure 25. Specifically, the rear structure 26 is constructed of the second set of at least peripheral ribs 15 (three peripheral ribs 15 being shown in FIG. 5) which extend along the rear longer side of the lid body 2 and are spaced apart from one another. A plurality of second short ribs 17 connect together the second set of at least two peripheral ribs 15 to partition the spaces between the peripheral ribs 15 to define a plurality of compartments 16. A second closure plate 18 is fixed to the second set of at least two peripheral ribs 15 and the second short ribs 17. The closure plate 18 can be fixed by an adhesive. To both end portions of the closure plate 18, a pair of right and left hinge anchoring plates 19 (FIG. 7) can be attracted for mounting the hinges 6 on the lid body 2.

Similarly to the first embodiment, a third pair and a fourth pair of peripheral ribs 21 extend along the shorter sides of the lid body 2. A first set of angular ribs 8 continuously extend to connect a generally central portion of the one longer side of the lid body and the two end portions of the other longer side. A second set of angular ribs 9 continuously extend to connect a generally central second portion of the other longer side and the two end portions of the one longer side of the lid body 2. Additional angular ribs 23, 24 arranged parallel to the first and second set of angular ribs 8, 9 can be provided partitioning the spaces therebetween into a plurality of rhombic compartments 22.

While all of the ribs 7, 8, 9, 15, 21, 23, and 24 are molded integrally with the lid body 2, the closure plates 11 and 18 are made separately and can be made either of a synthetic resin or a metal plate.

The box-shaped structures 25 and 26 arranged at the front longer side and the back longer side of the lid body give especially high rigidity to the front and rear end portions of the lid body. These box-shaped structures 25 and 26 coact with the grouped intermediate ribs establish high torsional rigidity.

The box-shaped structure 25 and 25 and the additional ribs 8, 9, 21, 23, and 24 coact to strengthen the torsional rigidity of the cover member and the facial rigidity thereof. As a result, the cover member can be effectively reinforced even if the ribs are reduced in number and made lower in height. This makes it possible to provide a cover member for an automobile which has light weight and enhanced rigidity with a relatively small thickness.

FIG. 8 shows a modification of the first embodiment of the present invention which can be considered in part a third embodiment. It is well known in the art that certain portions of an automobile engine may extend further upwardly then the majority of the engine. For example, the air cleaner A of an engine E may extend higher than the remaining portions of the engine E and thus be positioned closest to the lid body 2. This can create the problem that either the entire lid body 2 must be raised to prevent interference between the ribs an the air cleaner or reinforcement in the region of the air cleaner must be foregone. It is desirable in today's designing of automobiles to have the front portion of the automobile be low. This embodiment or the modification to the embodiment of the present invention is designed to accomplish these goals. Specifically, portions 8a and 9a of the angular ribs 8 and 9 which are located in a small area 27 facing the top of the air cleaner A are made smaller in height so as to provide additional clearance for the air cleaner A. Adjacent these portions 8a and 9a, additional auxiliary ribs 28 are provided of the same height as the ribs 8a and 9a and connect these low portions 8a and 9a to each other.

Thus, the distribution density of the ribs existing in the small area 27 is higher than that of the ribs in the other areas so that the reduction in rigidity of the bonnet as a result of the smaller height of the portions 8a and 9a of the angular ribs 8 and 9 is compensated for.

Although this modification has been shown with respect to an air cleaner A, similar structures could be provided for other upwardly extending portions of the engine such as various control units, an ignition distributor, a radiator cap, a cylinder head cover, and so forth depending upon the design of the particular engine and the particular automobile.

It is readily apparent that the above described structure for reinforcing automotive cover member of synthetic resin meets all of the object mentioned above and also has the advantage of wide commercial utility. It should be understood that the specific forms of the invention hereinabove described are intended to be representative only, as certain further modifications within the scope of these teachings will be apparent to those skilled in the art.

Accordingly, reference should be made to the following claims in determining the full scope of the invention.

What is claimed is:

1. A reinforced cover member for an automobile comprising:
    a lid body having a generally rectangular shape, a top face, and a bottom face;
    a plurality of ribs extending generally perpendicularly from said bottom face, said ribs and said lid body being integrally molded of a synthetic resin, said ribs including a first set of at least two peripheral ribs extending along one longer side of said lid body, a second set of at least two peripheral ribs extending along the other longer side of said lid body, a third pair and a fourth pair of peripheral ribs extending along the shorter sides of said lid body, a first set of angular ribs continuously extending to connect a generally central point of said one longer side of said lid body and the two end portions of said other longer side, a second set of angular ribs continuously extending to connect a generally central point of said other long side of said lid body and the two end portions of said one longer side, first short ribs connecting together said first set of at least two peripheral ribs, and second short ribs connecting together said second set of at least two peripheral ribs;
    a first closure plate fixed to said first set of at least two peripheral ribs and said first short ribs defining plural closed compartments;
    and a second closure plate fixed to said second set of at least two peripheral ribs and said second short ribs defining further plural closed compartments.

2. The cover member as claimed in claim 1, wherein said ribs further include additional angular ribs arranged parallel to said first set and said second set of angular ribs.

3. The cover member as claimed in claim 1, further comprising a striker anchoring portion at said generally central point of said one longer side, a striker attached to said striker anchoring portion, hinge anchoring portions at each said end portion of said other longer side, and hinges attached to said hinge anchoring portions.

* * * * *